US006891548B2

(12) United States Patent
Alcorn et al.

(10) Patent No.: US 6,891,548 B2
(45) Date of Patent: May 10, 2005

(54) SYSTEM AND METHOD FOR CALCULATING A TEXTURE-MAPPING GRADIENT

(75) Inventors: Byron Alcorn, Ft. Collins, CO (US); Jason Kassoff, Ft. Collins, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 167 days.

(21) Appl. No.: 10/226,967

(22) Filed: Aug. 23, 2002

(65) Prior Publication Data

US 2004/0036692 A1 Feb. 26, 2004

(51) Int. Cl.[7] .................................................. G09G 5/00
(52) U.S. Cl. ........................ 345/586; 345/606; 345/643
(58) Field of Search ................................ 345/582–588, 345/589–605, 606, 643

(56) References Cited

U.S. PATENT DOCUMENTS

| | | | |
|---|---|---|---|
| 5,361,386 A | * 11/1994 | Watkins et al. ............. 345/647 |
| 5,550,960 A | 8/1996 | Shirman et al. |
| 5,719,600 A | * 2/1998 | Alcorn ....................... 345/587 |
| 6,005,583 A | * 12/1999 | Morrison .................... 345/587 |
| 6,211,882 B1 | 4/2001 | Pearce et al. |
| 6,232,981 B1 | 5/2001 | Gossett |
| 6,256,038 B1 | 7/2001 | Krishnamurthy |
| 6,275,235 B1 | 8/2001 | Morgan, III |
| 6,285,372 B1 | 9/2001 | Cowsar et al. |
| 6,300,958 B1 | 10/2001 | Mallet |
| 6,646,648 B1 | * 11/2003 | Donham .................... 345/582 |

FOREIGN PATENT DOCUMENTS

EP 0 319 165 A2 * 11/1988 ........... G06F/15/72

OTHER PUBLICATIONS

Foley, Van Dam, Feiner, Hughes, "Computer Graphics: Principles and Practice, Second Edition in C," AddisonWesley Publishing Company, 1996, Inc., pp 606.*

Heckbert, Paul S., Moreton, Henry P., "Interpolation for Polygon Texture Mapping and Shading," State of the Art in Computer Graphics: Visualization and Modeling, David F. Rogerts and Rae A. Earnshaw, eds. Springer–Verlag, New York, 1991, pp 101–111.*

Meyer, M., Lee, H., Barr, A., Deshbrun M.; "Generalized Barycentric Coordinates on Irregular Polygons," IEE, 2002.*

Wu, Kevin; "Rational Linear Interpolation of Texture Coordinates and Their Partial Derivatives" Computer Systems Laboratory; Hewlett–Packard Company; HPL–98–113; Jun. 1998.*

* cited by examiner

*Primary Examiner*—Matthew C. Bella
*Assistant Examiner*—Alysa N. Brautigam (57) ABSTRACT

Systems and methods provide a more efficient and effective gradient computation. Specifically, in one embodiment, a method is provided for calculating a texture-mapping gradient, which comprises calculating constant values for use in a gradient-calculating equation, passing the constant values to logic configured to calculate the gradient, and computing the gradient using barycentric coordinates and the calculated constant values. In accordance with another embodiment, an apparatus is provided for calculating a texture-mapping gradient, which comprises logic for calculating constant values for use in a gradient-calculating equation, and logic for computing the gradient-calculating equation using barycentric coordinates and the calculated constant values. In accordance with another embodiment, a computer-readable medium is also provided that contains code (e.g., RTL logic) for generating the computational logic mentioned above.

8 Claims, 7 Drawing Sheets

SYSTEM AND METHOD FOR CALCULATING A TEXTURE-MAPPING GRADIENT

BACKGROUND OF THE INVENTION

1. Field of the Invention

The present invention relates to computer graphics systems and, more particularly, to a system and method for calculating a texture-mapping gradient.

2. Discussion of the Related Art

Computer graphics systems are commonly used for displaying graphical representations of objects on a two-dimensional video display screen. Current computer graphics display systems provide highly-detailed representations and are used in a variety of applications. A computer graphics display system generally comprises a central processing unit (CPU), system memory, a graphics subsystem and a video display screen.

In typical computer graphics display systems, an object to be presented on the display screen is broken down into graphics primitives. Primitives are basic components of a graphics display and may include points, lines, vectors and polygons (e.g., triangles and quadrilaterals). Typically, a hardware/software scheme is implemented to render, or draw, the graphics primitives that represent a view of one or more objects being illustrated on the display screen.

Generally, the primitives of a three-dimensional object to be rendered are defined by the host CPU in terms of primitive data. For example, when the primitive is a triangle, the host computer may define the primitive in terms of the X, Y and Z coordinates of its vertices. Additional primitive data may be used in specific applications. Rendering hardware interpolates the primitive data to compute the display screen pixels that represent each primitive.

The graphics subsystem generally includes a geometry accelerator, a rasterizer, a frame buffer controller and a frame buffer. The graphics subsystem may also include texture-mapping hardware. The geometry accelerator receives vertex data from the host CPU that defines the primitives that make up the view to be displayed. As is known, the operations of the geometry accelerator are computationally very intense. One frame of a three-dimensional (3-D) graphics display may include on the order of hundreds of thousands of primitives. To achieve state-of-the-art performance, the geometry accelerator may be required to perform several hundred million floating point calculations per second. Furthermore, the volume of data transferred between the host computer and the graphics hardware is very large. Additional data transmitted from the host computer to the geometry accelerator includes illumination parameters, clipping parameters and any other parameters needed to generate the graphics display.

As is known, a rasterizer receives data representing figures or objects and then provides the pixel-like representation of the figures. As is also known, texture-mapping involves applying one or more point elements (texels) of a texture to each point element (pixel) of the displayed portion of the object to which the texture is being mapped. Texture-mapping hardware is conventionally provided with information indicating the manner in which the texels in a texture map correspond to the pixels on the display screen that represent the object. Each texel in a texture map may be defined by s and t (and r, if three-dimensional texture map) coordinates which identify its location in the two-dimensional texture map. For each pixel, the corresponding texel or texels that map to it are accessed from the texture map, and incorporated into the final Red, Green, Blue (RGB) values generated for the pixel to represent the textured object on the display screen. As is known, in addition to two-dimensional texture maps, one-dimensional, three-dimensional, and even other-dimensional texture maps are also known. In this respect, the two-dimensional texture map has been mentioned for illustrative purposes only.

It should be understood that each pixel in an object primitive may not map in one-to-one correspondence with a single texel in the texture map for every view of the object. For example, the closer the object is to the view port represented on the display screen, the larger the object will appear. As the object appears larger on the display screen, the representation of the texture becomes more detailed. Thus, when the object consumes a fairly large portion of the display screen, a large number of pixels is used to represent the object on the display screen, and each pixel that represents the object may map in one-to-one correspondence with a single texel in the texture map, or a single texel may map to multiple pixels. However, when the object takes up a relatively small portion of the display screen, a much smaller number of pixels is used to represent the object, resulting in the texture being represented with less detail, so that each pixel may map to multiple texels. Each pixel may also map to multiple texels when a texture is mapped to a small portion of an object. Resultant texel data is calculated for each pixel that maps to more than one texel, and typically represents an average of the texels that map to that pixel.

Figure 1:
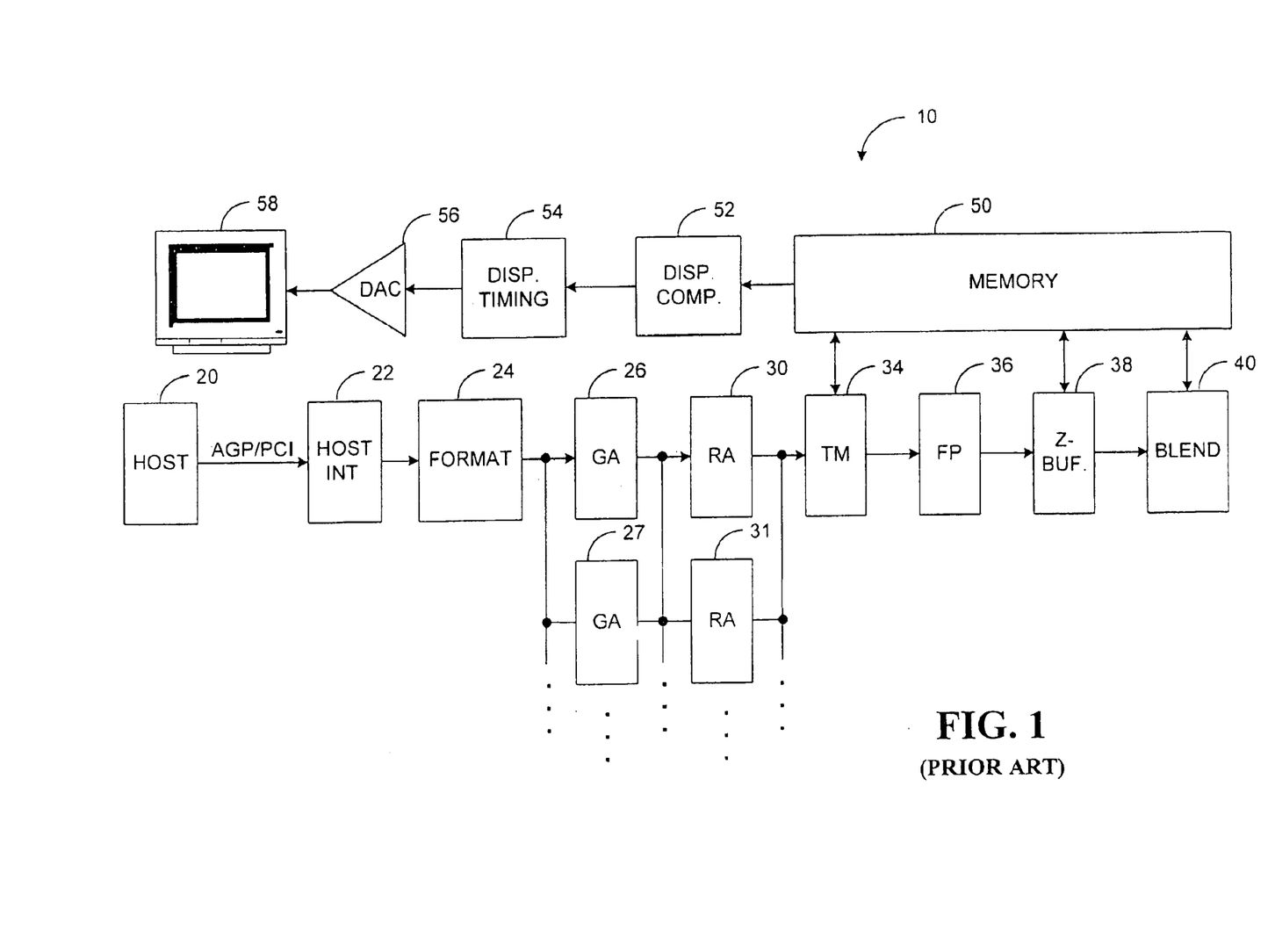
FIG. 1 illustrates a block diagram of a computer graphics system in accordance with the prior art.

To more particularly illustrate a conventional graphics system, reference is made to FIG. 1, which is a diagram illustrating a graphics pipeline 10 as is known. It should be noted at the outset that there are a variety of alternative manners to illustrate the graphics pipeline 10 illustrated in FIG. 1, and that the diagram of FIG. 1 is presented for illustration only.

As illustrated, a host computer 20 typically communicates with the graphics hardware across a high-speed bus, such as an AGP (accelerated graphics port) bus or a PCI (peripheral component interconnect) bus. A host interface 22 is typically provided at the front end of the graphics hardware to interface with the high-speed bus. A format block 24 is provided downstream of the host interface 22. One or more geometry accelerators 26 and 27, and one or more rasterizers 30 and 31 are provided downstream of the format block 24. Information produced or generated by each geometry accelerator is broadcast to all downstream rasterizers. The operation of geometry accelerators and rasterizers, and methods/configurations for operating multiples of these components are known, and therefore need not be described herein.

Downstream of the rasterizers 30 and 31 are texture-mapping hardware 34, a fragment processor 36, the Z-buffer 38, and blend hardware 40. The function and operation of each of these components are known and need not be described herein. As is known, however, texture-mapping hardware systems typically include a local memory subsystem 50 that stores data representing a texture associated with the object being rendered.

Downstream of the texture-mapping hardware are subsystems including display composition 52, display timing 54, digital-to-analog converter (DAC) 56, and a display 58. As is known, the display composition hardware 52 processes different object/primitive layers to determine the color of a given pixel to be displayed.

Texture mapping involves applying one or more texture map elements, or texels, of a texture to each pixel of the displayed portion of the object to which the texture is being mapped. Each texel in a texture map is defined by coordinates (generally two or more spatial coordinates, e.g., s, t, and, sometimes, a homogeneous texture effect parameter q) which identify its location in the texture map (two-dimensional or greater). For each pixel, the corresponding texel(s) that maps to the pixel is accessed from the texture map via the texel coordinates (e.g., s, t, q of an orthogonal coordinate system) associated with that pixel and is incorporated into the final R, G, B values generated for the pixel to represent the textured object on the display screen. It should be understood that each pixel in an object primitive may not map in a one-to-one correspondence with a single texel in the texture map for every view of the object.

Texture-mapping systems typically store data in memory representing a texture associated with the object being rendered. As indicated above, a pixel may map to multiple texels. If it is necessary for the texture-mapping system to read a large number of texels that map to a pixel from memory to generate an average value, then a large number of memory reads and the averaging of many texel values would be required, which would undesirably consume time and degrade system performance.

To overcome this problem, a well-known scheme has been developed that involves the creation of a series of MIP (multum in parvo, or many things in a small place) maps for each texture, and storing the MIP maps of the texture associated with the object being rendered in memory. A set of MIP maps for a texture includes a base map that corresponds directly to the texture map as well as a series of related filtered maps, wherein each successive map is reduced in size by a factor of two in each of the texture map dimensions (s, t, and r). In a sense, the MIP maps represent different resolutions of the texture map.

Figure 2:
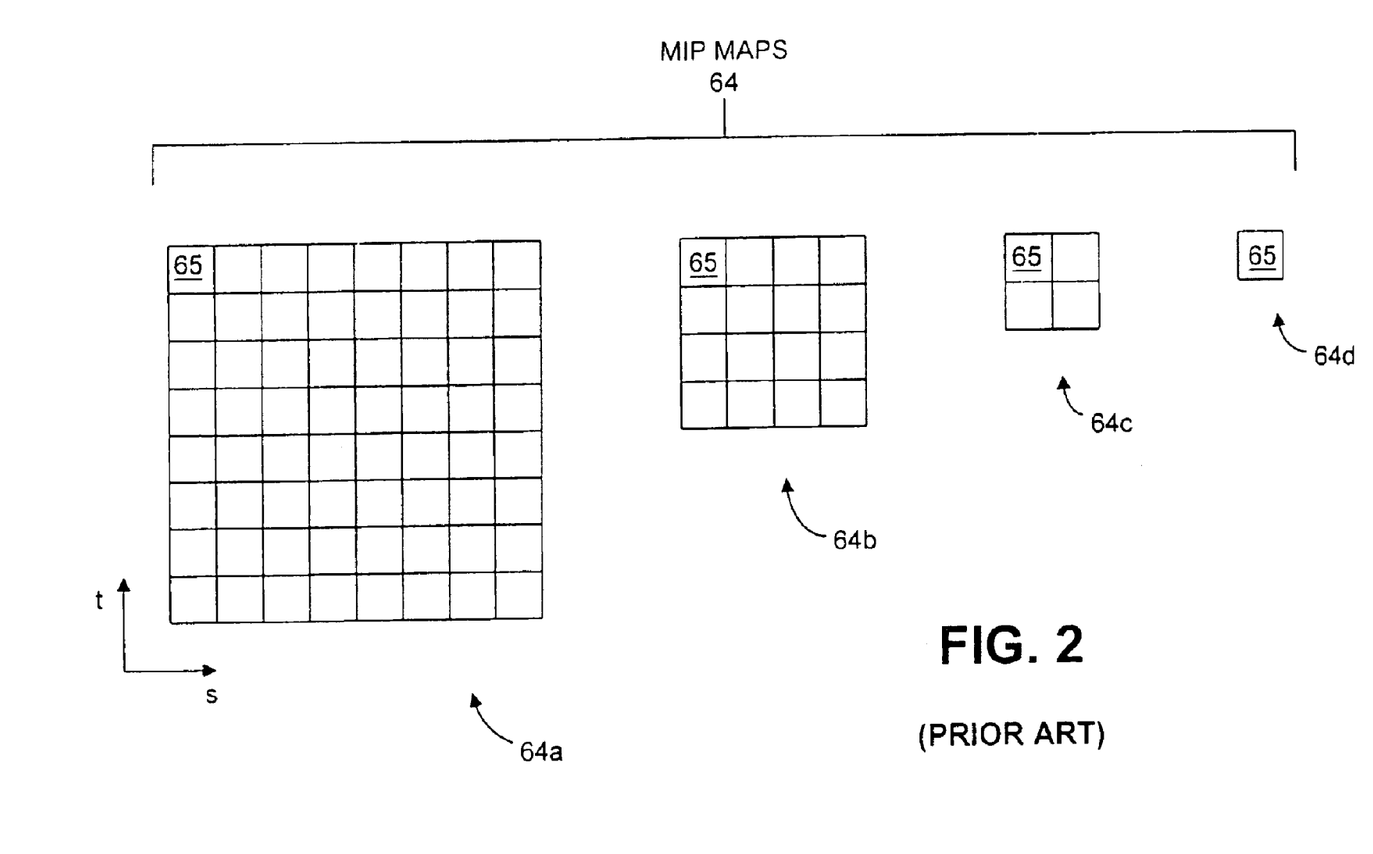
FIG. 2 illustrates an example set of MIP maps.

An illustrative example of a set of MIP maps is shown in FIG. 2. In this simplified example, the MIP maps of FIG. 2 are two dimensional (s, t) and include a base map 64a (the reference) that is eight-by-eight texels 65 in size, as well as a series of maps 64b, 64c, and 64d that are respectively four-by-four texels 65, two-by-two texels 65, and one texel 65 in size. The four-by-four map 64b is generated by box filtering (downsampling) the base map 64a. With box filtering, each texel 65 in the map 64b corresponds to an equally-weighted average of four adjacent texels 65 in the base map 64a. Further, the two-by-two map 64c is similarly generated by box filtering map 64b. Finally, the single texel 65 in map 64d is generated by box averaging the four texels 65 in map 64c.

The computer graphics system determines which MIP map 64 in a series of MIP maps 64a–64d to access in order to provide the appropriate texture data for a particular pixel 73 (see FIG. 3) based upon the number of texels 65 to which the pixel 73 maps. For example, if the pixel 73 maps in a one-to-one correspondence with a single texel 65 in the texture map, then the base map 64a is accessed. However, if the pixel maps to four, sixteen, or sixty-four texels, then the maps 64b, 64c and 64d are respectively accessed because those maps respectively store texel data representing an average of four, sixteen, and sixty-four texels 65 in the texture map.

Figure 3:
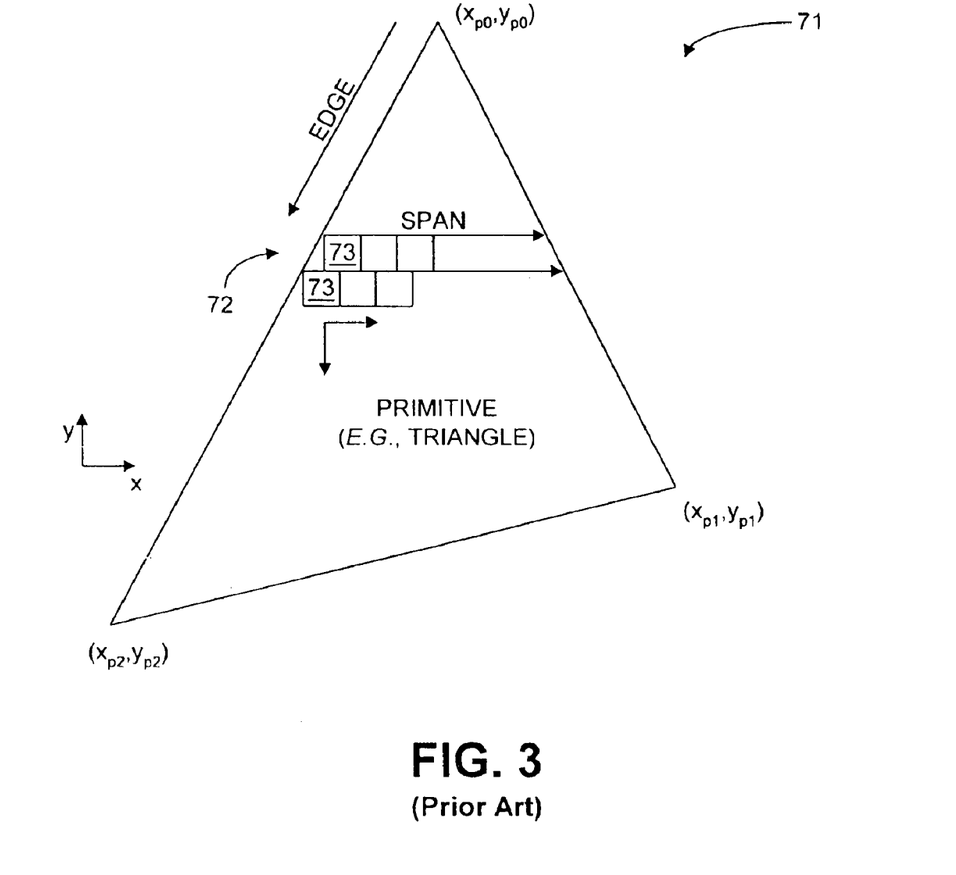
FIG. 3 illustrates a portion of a scan-conversion process in a triangle primitive, in accordance with a prior art approach.

In order to determine the number of texels 65 to which a pixel 73 maps so that the appropriate MIP map 64 can be accessed, gradients (mathematical derivatives) of the various texel coordinates with respect to screen coordinates are computed. In this regard, gradient values $\partial i/\partial x$, $\partial i/\partial y$, where i is s or t in the texel domain and where x, y are screen coordinates, are calculated. These gradients reflect the rate of change of texture coordinates 65 relative to pixel coordinates 73. Often, a single gradient is allocated to each pixel 73 by selecting the largest gradient.

Prior methods for determining the gradients generally rely on using some form of either a linear-difference formula or a central-difference formula. The former is more popular than the latter due, in part, to its simplicity and ease of implementation. With a linear-difference formula, each gradient derivative is essentially equal to an old gradient derivative plus a constant. Given the gradient at the vertices of a triangular primitive 71, the gradients along the edges as well as along the spans 72 of the primitive 71 are linearly approximated. When a central-difference formula is employed, each gradient derivative is essentially equal to a weighted sum of nearby gradient derivatives. Although useful to an extent, these methods for calculating gradients are inaccurate, especially for highly spatially perspected rendered primitives 71. The larger the primitive 71, the more spatially-perspected and the greater the error. Furthermore, these methods are computationally complex relative to the degree of accuracy that they accomplish.

Another prior approach includes the calculation of gradient values by the geometry accelerator. Generally, this approach is undesirable because it places an additional computational load on the geometry accelerator, which already bears a significant computational load.

Yet another prior approach includes the calculation of gradient values as part of the scan-conversion process, within the rasterizer. Under this approach, gradient values are created by calculating texel values of adjacent pixels. That is, as the scan converter steps down one side of a triangle primitive, processing each successive scan line, gradient values are calculated for each pixel by calculating difference (or delta) values of a current pixel with an adjacent pixel on the same scan line and an adjacent pixel on the next scan line. This approach is undesirable because it adds hardware and complexity to the rasterizer.

SUMMARY OF THE INVENTION

Accordingly, a system and method are desired to provide a more efficient and effective gradient computation. Specifically, one embodiment of the invention is directed to a method for calculating a texture-mapping gradient, which comprises calculating constant values for use in a gradient-calculating equation, passing the constant values to logic configured to calculate the gradient, and computing the gradient using barycentric coordinates and the calculated constant values.

In accordance with another embodiment of the invention, an apparatus is provided for calculating a texture-mapping gradient, which comprises logic for calculating constant values for use in a gradient-calculating equation, and logic for computing the gradient-calculating equation using barycentric coordinates and the calculated constant values.

DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION

As described above, the purpose and use of a gradient value in the texture-mapping process is known. The preferred embodiment of the present invention is directed to a novel method and apparatus for calculating such a gradient value. As will be appreciated from the description provided herein, embodiments of the invention realize effective and efficient systems and methods for computing the gradient value.

In accordance with an embodiment of the invention, a gradient value is calculated utilizing barycentric coordinates. As will be appreciated from the description below, the use of barycentric coordinates greatly simplifies the process by eliminating the need to provide additional rasterizer hardware in order to compute parameters of adjacent pixels. It also avoids the use of geometry accelerator in the process, thereby reducing the computational load on the geometry accelerator.

A barycentric coordinate system is defined in OpenGL (OpenGL is a registered trademark of Silicon Graphics, Inc.). Consequently, the mathematical model defining barycentric coordinates will be understood by persons skilled in the art. For completeness, however, barycentric coordinates are described briefly herein with reference to FIG. 4, which illustrates an exemplary triangle 80 for implementing the barycentric coordinate system. The triangle 80 includes three sides 82, 84, and 86. The triangle 80 is defined by three vertices A, B, and C, which have three-dimensional texture coordinates $(s_A, t_A, r_A)$, $(s_B, t_B, r_B)$, and $(s_C, t_C, r_C)$, respectively.

Figure 4:
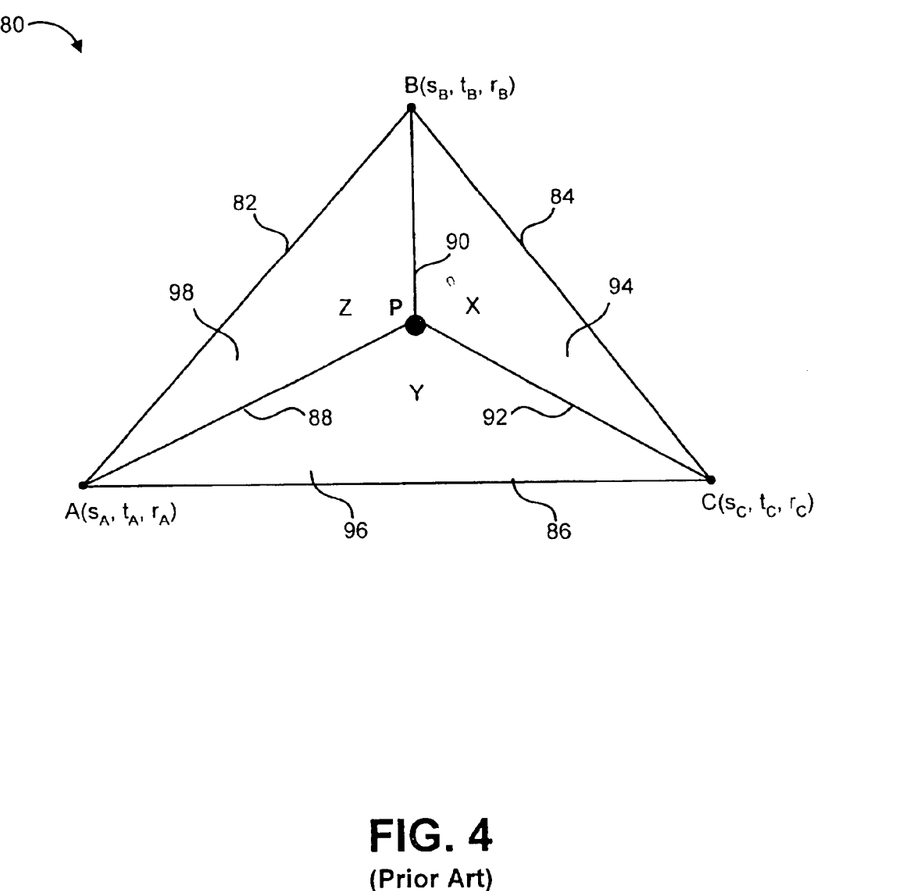
FIG. 4 illustrates an exemplary triangle primitive in barycentric coordinates.

An arbitrary point P within the triangle 80 is characterized by a coordinate $(s_P, t_P, r_P)$. The point P and the vertices A, B, and C define three sides 88, 90, and 92, respectively. The sides 82, 84, and 86 of the triangle 80 and the sides 88, 90, and 92 form three sub-triangles 94, 96, and 98. In this configuration, the coordinate $(s_P, t_P, r_P)$ of the point P is uniquely defined by the areas X, Y, and Z of sub-triangles 94, 96, and 98, respectively. The areas X, Y, and Z form the basic coordinate units in the barycentric coordinate system.

To further simplify the barycentric coordinate system, if the area of the triangle 80 is normalized to 1, then the point P can be uniquely defined by the areas of any two sub-triangles. For example, if the areas of sub-triangles 94, 96, and 98 are X, Y, and Z, respectively, then X+Y+Z=1. Hence, the area Z can be defined in terms of the other two areas: Z=1−(X+Y). Consequently, the coordinate (s, t, r) of the point P can then be defined by the following barycentric equations, based on barycentric coordinates (X, Y):

$$s_P=(s_A-s_C)X+(s_B-s_C)Y+s_C; \quad \text{Equation 1}$$

$$t_P=(t_A-t_C)X+(t_B-t_C)Y+t_C; \quad \text{Equation 2}$$

and $$r_P=(r_A-r_C)X+(r_B-r_C)Y+r_C. \quad \text{Equation 3}$$

As described above, the gradient is a quantity that indicates the size of a pixel in texture-map space. For example, if a 256×256 texture map is projected onto an object that occupies a 128×128 pixel portion of the screen, then the gradient is 2. In this example, each step in pixel space equals two steps in texel space. Of course, the gradient can be different with respect to the x and y directions in pixel space. Also, there may be a component in each direction of up to three texture coordinate axes, s, t, and r. Partial gradients can be computed as:

$$G_{sx}=ds/dx \quad G_{sy}=ds/dy \quad \text{Equation 4}$$

$$G_{tx}=dt/dx \quad G_{ty}=dt/dy \quad \text{Equation 5}$$

$$G_{rx}=dr/dx \quad G_{ry}=dr/dy \quad \text{Equation 6}$$

Here, $G_{sx}$ represents the change in s for a given change in x.

In prior approaches, using 2D texture mapping as a nonlimiting example, the s and t quantities were computed on a per-vertex basis. Then the magnitude of the two x components became the x-gradient, and the magnitude of the two y components became the y-gradient. Both gradients were interpolated per-pixel and perspective-corrected. Then the larger of the two was used as the final gradient. The log-base-2 of this gradient, the level-of-detail (or LOD), was used to select a map level for MIP-map filtering.

Unfortunately, when the x and y gradients differ by a large amount, the square MIP-map filter causes the final image to lose more detail in the direction of the smaller gradient than is necessary to prevent aliasing. To avoid this shortcoming, anisotropic filtering may be used, which uses a non-square filter whose shape and orientation depend on the partial gradients described above.

Prior implementations have used scan-line rasterization, which stepped down the edges of each triangle in the y direction and then stepped across in the x direction. Instead, in accordance with the invention, barycentric (or parametric) rasterization is utilized. This entails defining a barycentric coordinate system whose axes align with two edges of the triangle. One parameter, a, increases from 0 to 1 along the first axis, while the second parameter, b, increases from 0 to 1 along the second axis. The value of a parameter p for a given point (a, b) in the triangle can be described by the parametric eqaution:

$$p=p_0+a*dp_1+b*dp_2 \quad \text{Equation 7}$$

Here, $p_0$ is the initial value of the parameter at the vertex where a and b are both 0. The quantities $dp_1$ and $dp_2$ represent the change in the parameter from the origin (a, b)=(0, 0) to the points (1, 0) and (0, 1) respectively.

The partial gradient was defined above as the change in a texture parameter (s, t, or r) for a given change in screen coordinate (x or y). In accordance with an inventive approach, the following is defined:

$p_n = p_0 + a_n * dp_1 + b_n * dp_2$, the parameter value at $(a_n, b_n)$; Equation 8

$p_{nx} = p_0 + a_{nx} * dp_1 + b_{nx} * dp_2$, the parameter value at $(a_n, b_n)$ plus 1 in x; Equation 9

$p_{ny} = p_0 + a_{ny} * dp_1 + b_{ny} * dp_2$, the parameter value at $(a_n, b_n)$ plus 1 in y; Equation 10

In these definitions:

$a_{nx} = a_n + da/dx \quad b_{nx} = b_n + db/dx$ \hfill Equation 11

$a_{ny} = a_n + da/dy \quad b_{ny} = b_n + db/dy$ \hfill Equation 12

Isolating the partial gradient $G_{px}$, which is the change in p for a given change in x, and dividing by the homogeneous coordinate q to make this the most general case:

$$G_{px} = p_{nx}/q_{nx} - p_n/q_n \qquad \text{Equation 13}$$
$$= (p_{nx} * q_n - p_n * q_{nx})/q_{nx} * q_n$$

Now, solving for $p_{nx}$, starting with the above definitions:

$$p_{nx} = p_0 + (a_n + da/dx)dp_1 + (b_n + db/dx)dp_2 \qquad \text{Equation 14}$$
$$= (p_0 + a_n * dp_1 + b_n * dp_2) + (da/dx)dp_1 + (db/dx)dp_2$$
$$= p_n + (da/dx)dp_1 + (db/dx)dp_2$$

A similar calculation for $q_{nx}$ gives:

$q_{nx} = q_n + (da/dx)dq_1 + (db/dx)dq_2$ \hfill Equation 15

Plugging back into the partial gradient formula of Equation 13 gives:

$G_{px} = \{[p_n + (da/dx)dp_1 + (db/dx)dp_2]q_n - [q_n + (da/dx)dq_1 + (db/dx)dq_2]p_n\}/\{[q_n + (da/dx)dq_1 + (db/dx)dq_2]q_n\}$ \hfill Equation 16

Canceling the $p_n * q_n$ tems gives:

$G_{px} = \{[(da/dx)dp_1 + (db/dx)dp_2]q_n - [(da/dx)dq_1 + (db/dx)dq_2]p_n\}/\{[q_n + (da/dx)dq_1 + (db/dx)dq_2]q_n\}$ \hfill Equation 17

Dividing numerator and denominator by $q_n$ gives:

$G_{px} = \{[(da/dx)dp_1 + (db/dx)dp_2] - [(da/dx)dq_1 + (db/dx)dq_2](p_n/q_n)\}/\{[q_n + (da/dx)dq_1 + (db/dx)dq_2]\}$ \hfill Equation 18

Defining some constants gives:

$G_{px} = \{C_{px} - C_{qx}(p_n/q_n)\}/\{q_n + C_{qx}\}$ \hfill Equation 19

$C_{px} = (da/dx)dp_1 + (db/dx)dp_2$ \hfill Equation 20

$C_{qx} = (da/dx)dq_1 + (db/dx)dq_2$ \hfill Equation 21

When the gradient calculation is structured as set out above, it is observed that the da/dx and db/dx portions of the equation are constant values for the entire triangle primitive. Dividing the numerator and denominator by $C_{qx}$ and redefining constants gives:

$G_{px} = \{C_{p0x} - (p_n/q_n)\}/\{C_{1x} * q_n + 1\}$, \hfill Equation 22

$C_{p0x} = C_{px}/C_{qx}$, and \hfill Equation 23

$C_{1x} = 1/C_{qx}$ \hfill Equation 24

In a preferred hardware implementation, the constants $C_{sx}$, $C_{tx}$, $C_{rx}$, and $C_{qx}$ are computed by existing rasterizer hardware. The ratios $C_{s0x}$, $C_{t0x}$, $C_{r0x}$, and $C_{1x}$ are generated in rational linear interpolator (RLI) hardware (see FIG. 5). The y partial gradients are calculated similarly by replacing the x subscripts in the above formulas with y subscripts.

Consequently, the partial gradient calculation may be set up with only a couple of extra states per triangle primitive. The final partial gradients, of course, are computed on a per-pixel basis from the interpolated s/q, t/q, r/q, and q/w values, which come out of the RLI. In a preferred embodiment a dedicated block of hardware, the gradient block (see FIG. 5), implements the above formula to compute these partial gradients.

Figure 5:
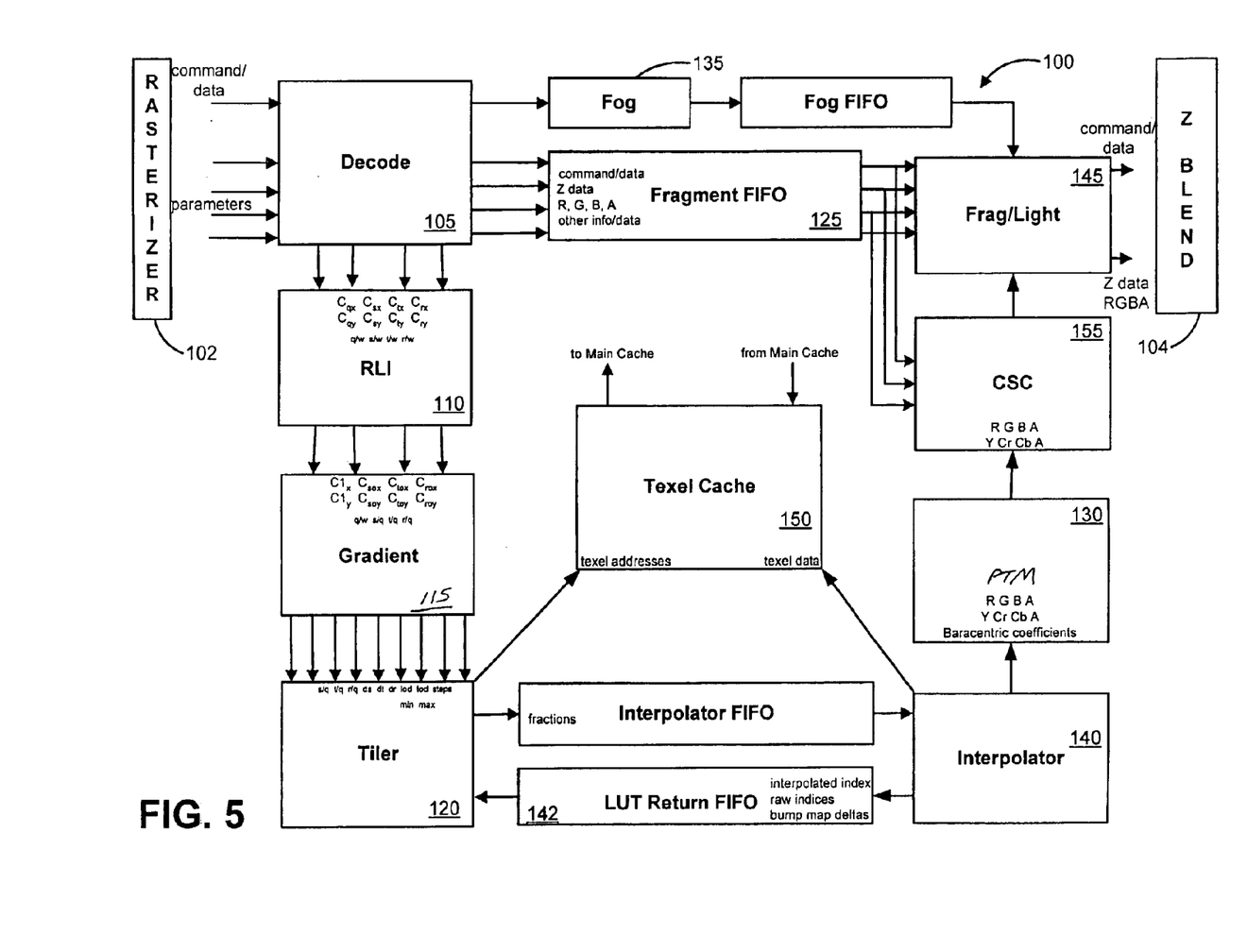
FIG. 5 is a block diagram of texture-mapping logic constructed in accordance with one embodiment of the present invention.

In this regard, reference is made to FIG. 5, which is a block diagram of logic 100 used to perform the texture-mapping operation of one embodiment of the invention. As will be described below, this hardware includes logic for carrying out the gradient calculation of the invention. As illustrated in FIG. 1, the texture-mapping hardware is functionally interposed between the rasterizer 102 and Z-Blend logic 104. The functional operation of components, like the rasterizer 102 and Z-Blend logic 104, are well known and need not be described herein. In a preferred embodiment, however, the rasterizer logic 102 is configured to deliver command and data values, as well as pixel parameters to the texture-mapping logic 100. These values are delivered to a decoder (or decode logic 105). This logic block includes an interface to the rasterizer 102 (upstream of the texture-mapping logic), and it interprets incoming command/data packets as register reads, register writes, or pixels. The decode logic 105 also aligns and routes incoming data to three downstream paths: the fragment FIFO 125, the RLI block 110, and the Fog block 135. If the command received by the decode logic 105 is a register access, then the decode logic 105 sends a single transaction through the pipeline, which provides appropriate logic for passing through such register accesses. If the command received by the decode logic 105 is a register read, the data will leave the texture-mapping logic 100 split into a command/data pair. In short, the decode logic 105 is configured to decode an incoming command/data pair, attach a type field to the incoming data, select a destination for the incoming data.

As described above, in a preferred embodiment, the rasterizer 102 computes certain constant values ($C_{qx}$, $C_{sx}$, $C_{tx}$, $C_{rx}$, etc.). These constant values are passed through the decode logic 105 to the RLI logic 110. The RLI logic 110 performs perspective-correcting division of the texture coordinates. In short, it takes the interpolated coordinates s/w, t/w, r/w, and q/w and divides the first three by q/w to obtain s/q, t/q, and r/q. These are the ratios of linearly-interpolated coordinates, and are output to the gradient logic 115. In the preferred embodiment, the rasterizer 102 sends the pixel coordinates as floating-point numbers ranging from zero to one (where 0.0 represents the left edge of a texture and 1.0 represents the right edge). This differs from prior approaches in which coordinates were in texel space (i.e., they represented how many texels to step across in the base map). To preserve an acceptable level of precision over a wide range of values, the coordinates were pre-shifted and post-shifted, and the division was done on intermediate fixed-point values. Another difference between embodiments of the present invention and previous designs lies in the gradient calculation. As described above, the gradient represents the number of texels that are covered by a single pixel in the raster. In the past, the gradient was computed at each vertex by the geometry accelerator. Then the rasterizer interpolated it, and the texture-mapping logic divided g/w by q/w along with the texture coordinates. However, in embodiments of the present invention, the rasterizer sends primitive constants that are used with the per-pixel coordinates to compute partial gradients for each coordinate with respect to X and Y. Advantageously, this allows for an isotropic filtering within the tiler 120 downstream. The RLI logic 110 does not compute the gradient itself. Rather it prepares the constants from the rasterizer 102 by dividing three of them by q/w, and passing the resulting values on to the gradient logic 115.

In accordance with a preferred embodiment of the invention, gradient logic 115 is provided. The gradient logic 115 utilizes the primitive constants passed from the RLI logic 110 to compute partial gradients. In a preferred embodiment, the six partial gradients are $G_{sx}$, $G_{tx}$, $G_{rx}$, $G_{sy}$, $G_{ty}$, and $G_{ry}$. The partial gradient $G_{sx}$ refers to the change in texture coordinate S that results from a given change in screen coordinate X. The nomenclature of the other partial gradients represent similar values (i.e., the change in texture coordinates s, t, and r that result from a given change in screen coordinate X or Y). From the partial gradients, the gradient logic 115 computes the maximum level of detail (used in traditional MIP map filtering), the minimum level of detail (used in anisotropic filtering), and the number and sizes of steps taken along the axis of anisotropy. The texture coordinates s/q, t/q, and r/q, which are used in the gradient calculations, are also passed through the gradient logic 115 to the tiler logic 120.

The primary function of the tiler logic 120 is to use texture coordinates to generate physical addresses to access texels in memory. The tiler logic 120 may be best understood by following a texel through from start to finish. If anisotropic filtering is enabled, the tiler first steps through all of the samples along the line of anisotropy, generating a new set of coordinates at each point. Each sample is treated as a separate texel from that point on, until the interpolator logic 140 recombines it with the other samples for that pixel. In the intervening period, the level of detail is used to select the proper maps from the MIP map pyramid. Thereafter, the tiler logic 120 adjusts the s, t, and r coordinates. These coordinates are multiplied by the map sizes to convert them from the barycentric 0-to-1 space to texel space. In texel space, the coordinates are clamped based on the boundary and border mode. Finally, from the adjusted and clamped coordinates, the tiler logic 120 generates physical texel addresses and blending fractions, based on the dimension of the texture and the sampling mode. A texel cache 150 is provided and configured to supply texel words after the tiler logic 120 presents the texel addresses. Of course, if the addresses result in a "miss" within the texel cache, the texel cache 150 will pass on the request to a main cache (not shown).

Interpolator logic 140 is also shown. This logic 140 is configured to linearly interpolate multiple texel values. In the preferred embodiment, the texel cache 150 provides eight texels per state, and the tiler logic 120 provides five fractions for interpolating between the texel values. The interpolator logic 140 sends texel-indices or an interpolated texel-index back to the tiler logic 120 when a texture look-up table is active. Since the indices may arrive from the texel cache 150 in any order, the interpolator logic 140 maintains a look-up table (LUT) return FIFO 142, which can be written out of order, for holding look-up results until they can be sent to the tiler logic 120. The interpolator logic 140 is configured to support anisotropic filtering, D3D (Direct 3 Dimensional) bump mapping, and texture color keying. The results are then used to modify the texture coordinates (s and t) before the final lookup. For anisotropic filtering, the tiler logic 120 generates multiple axes per fragment. The interpolator logic 140 accumulates the results by adding them together and dividing (or right shifting) the sum to get the final value.

For D3D bump mapping, the interpolator applies a 2×2 matrix to the results of the bump map access (specifically, the red and green channels that make up the normal vector to be transformed). Then, the transformed values are passed back to the tiler logic 120 through the LUT return FIFO 142, and they are added to the subsequent texture's coordinates. In addition, a luminance bump map may be specified, which means the blue channel of the bump map look-up multiplies, or scales, each channel of the result of the second look-up.

Texture color keying entails two D3D features. A first feature, like the color source keying performed in the fragment processor 145 sends a flag if the color falls in a color key range and the entire fragment is discarded by the fragment processor if the flag is set. This feature may be implemented in the fragment processor, as opposed to the interpolator logic 140.

Parametric texture-mapping logic (PTM) 130 may also be provided. The PTM logic allows the color of a texture map to vary under different lighting and viewing conditions, creating a more realistic visual effect than traditional texture mapping. In one embodiment, the PTM logic 130 utilizes 8-bit coefficients for each texel. These are stored in a texture map, two words to a texel (i.e., only six of eight bytes are used). The PTM logic 130 first applies a scale and bias to each coefficient. Each coefficient has its own scale and bias values that are constant for a given texture. The algorithm uses three other values per pixel: U, V, and Dot. U and V represent the projection of the specified vector (e.g., light direction, eye direction) onto a primitive to be textured, and Dot is the Dot product of the same vector with the surface normal of the primitive. The six coefficients A0–A5, U and V may be combined as follows:

$$C = A0 \times U \times U + A1 \times V \times V + A2 \times U \times V + A3 \times U + A4 \times V + A5. \quad \text{Equation 25}$$

Then, the dot product is used to adjust this value based on whether or how much the primitive is front-facing or back-facing. This final value represents one color channel, so applying an RGB parametric texture map employs three separate texture look-ups.

Color space conversion (CSC) logic 155 may also be provided. As is known, the color space logic 155 converts from $Y_{cbcr}$ to RGB color space and applies contrast and brightness adjustments.

Z-Blend logic 104 and fragment lighting logic 145 may also be provided. In prior approaches, the fragment unit has been responsible for texture application, specular color application, fog application, color source keying, stippling, window clipping, anti-alias alpha application, and alpha test. In a preferred embodiment, the stippling and window-clipping functions are performed in the rasterizer 102. Moving these functions upstream of the texture mapping logic 100 reduces the number per-pixel operations performed. In the preferred embodiment, however, a new function is added to the fragment/lighting logic 145: H-space lighting. H-space lighting, which implements a version of bump mapping as well, is a method for achieving phong shading quality with considerably less computation. It utilizes ten per-pixel parameters from the rasterizer 102. Three of these parameters are used for the specular lighting effect, three for diffuse lighting, three for spot lighting, and one for distance attenuation.

In one embodiment, the method of calculating constant values more specifically comprises calculating constant values that include at least one selected from the group consisting of Csx, Ctx, CRX, and Cqx, wherein Csx is a constant defining an amount of change in s in the x direction, before perspective correction, wherein Ctx is a constant defining an amount of change in t in the x direction, before perspective correction, wherein Crx is a constant defining an amount of change in r in the x direction, before perspective correction, wherein s, t, and r are texture coordinates, and wherein Cqx is an amount that the perspective corrective parameter q changes in the x direction.

Similarly, the method of calculating constant values may comprise calculating constant values include at least one selected from the group consisting of Csy, Cty, Cry, and Cqy, wherein Csy is a constant defining an amount of change in s in the y direction, before perspective correction, wherein Cty is a constant defining an amount of change in t in the y direction, before perspective correction, wherein Cry is a constant defining an amount of change in r in the y direction, before perspective correction, wherein s, t, and r are texture coordinates, and wherein Cqy is an amount that the perspective correction parameter q changes in the y direction.

It will be appreciated that many of functions, features, and implementation details of the various logic components in FIG. 5 have either not been discussed, or have been only summarily described above. These implementation features and additional functions are not germane to the gradient calculation of the present invention, and therefore need not be described herein. Rather, the block diagram of FIG. 5 has been illustrated for purposes of completeness and to show where, in the illustrated embodiment, the logic for computing the gradient resides, in relation to the surrounding graphics logic.

It should be appreciated from the foregoing discussion that a significant aspect of the preferred embodiment flows from the utilization of barycentric coordinates in the gradient calculation. As set forth in the equations previously discussed, the computation of the partial derivatives results in a number of values, which are constant over a given triangle primitive. In one embodiment, the constant values may be generated by existing rasterizer hardware. However, consistent with the scope and spirit of the present invention, additional or different hardware may be utilized for calculating these constant values. In this regard, reference is made briefly to FIG. 6, illustrating an alternative embodiment of the present invention.

Figure 6:
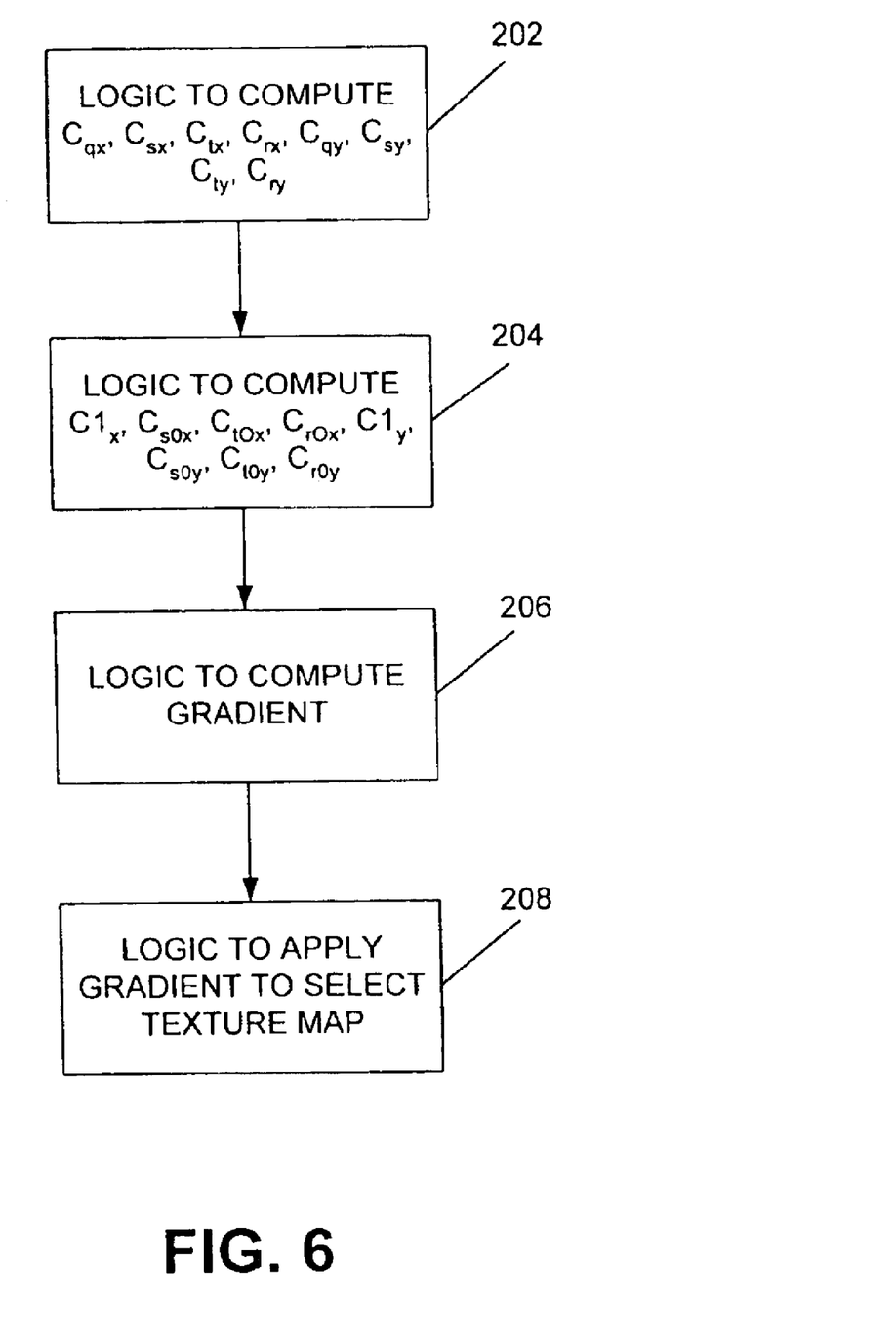
FIG. 6 is a flowchart illustrating certain method steps for calculating a texture-mapping gradient in accordance with one embodiment of the present invention.

In this regard, reference is made to FIG. 6, which is a block diagram illustrating certain, basic logic components that may be functionally coupled in accordance with one embodiment of the present invention. In such an embodiment, logic 202 may be provided for computing various constants, including, for example, $C_{qx}$, $C_{sx}$, $C_{tx}$, $C_{rx}$, $C_{qy}$, $C_{sy}$, $C_{ty}$, and $C_{ry}$. These constants have been described above, and need not be further described herein. Additional logic 204 may be provided and configured to compute $C1_x$, $C_{s0x}$, $C_{t0x}$, $C_{r0x}$, $C1_y$, $C_{s0y}$, $C_{t0y}$, and $C_{r0y}$. Again, these constants have been described herein above and need not be further described at this juncture. Additional logic 206 may be provided for operating on the various constants to compute a gradient for a given pixel. This gradient logic 206 may be implemented in a similar fashion to logic 115 of FIG. 5. The logic is preferably configured to compute the gradient in accordance with the gradient equation expressed herein above. Finally, additional logic 208 may be provided to apply the gradient that is computed by logic 206 to select the appropriate texture map.

Figure 7:
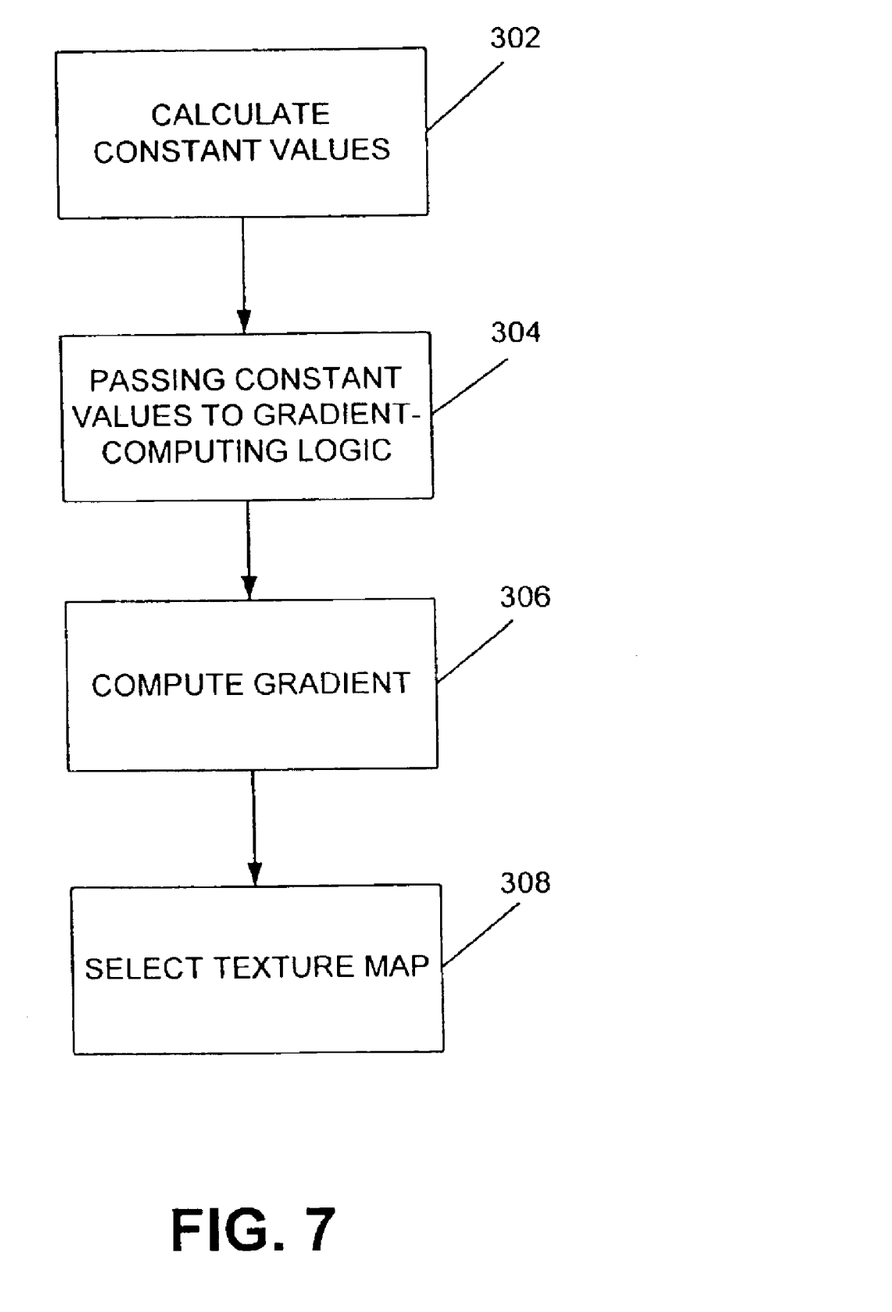
FIG. 7 is a flowchart illustrating certain method steps for calculating a texture-mapping gradient in accordance with an embodiment of the present invention.

Reference is now made to FIG. 7, which is a flow chart illustrating certain method steps of an embodiment of the present invention. In accordance with this embodiment, a method operates by calculating certain constant values (step 302), and passing those constant values to gradient-computing logic (step 304). Thereafter, a gradient is calculated using an equation that embodies the use of barycentric coordinates in the gradient computation (step 306). Finally, the computed gradient value is used to select an appropriate texture map for a given pixel (step 308).

It will be appreciated that one embodiment of the invention may be provided in the form of a computer-readable medium that contains code segments of register-transfer logic (RTL) that may be used to specify that actual hardware logic that is generated for carrying out the functional operations described above. In such an embodiment, the computer-readable medium may include code segments containing logic (e.g., equations or logic expressions) for generating other logic (e.g., hardware or integrated circuitry).

What is claimed is:

1. In a computer graphics system, a method for calculating a texture-mapping gradient comprising:

using a rasterizer to calculate constant values for use in a gradient-calculating equation;

passing the constant values to a rational linear interpolator that is configured to calculate the gradient; and computing the gradient using barycentric cordinates and the calculate constant values according to the following equation: $G_{px}=\{C_{px}-C_{qx}(P_n/q_n)\}/\{q_n+C_{qx}\}$, wherein $C_{px}=(da/dx)dp_1+(db/dx)dp_2$, wherein $C_{qx}=(da/dx)dq_1+(db/dx)dq_2$, and wherein da/dx and db/dx are constant values for an entire primitive, for non-zero values of Gpx, as defined by Equation 19 of the specification.

2. The method of claim 1, further comprising using the gradient to select a texture map.

3. The method of claim 1, wherein calculating constant values more specifically comprises calculating constant values that include at least one selected from the group consisting of $C_{sx}$, $C_{tx}$, $C_{rx}$, and $C_{qx}$, wherein $C_{sx}$ is a constant defining an amount of change in s in the x direction, before perspective correction, wherein $C_{tx}$ is a constant defining an amount of change in t in the x direction, before perspective correction, wherein $C_{rx}$ is a constant defining an amount of change in r in the x direction, before perspective correction, wherein s, t, and r are texture coordinates, and wherein $C_{qy}$ is an amount that the perspective correction parameter q changes in the x direction.

4. The method of claim 1, wherein calculating constant values more specifically comprises calculating constant values include at least one selected from the group consisting of $C_{sy}$, $C_{ry}$, $C_{ty}$, and $C_{qy}$, wherein $C_{sy}$ is a constant defining an amount of change in s in the y direction, before perspective correction, wherein $C_{ty}$ is a constant defining an amount of change in t in the y direction, before perspective correction, wherein $C_{ry}$ is a constant defining an amount of change in r in the y direction, before perspective correction, wherein s, t, and r are texture coordinates, and wherein $C_{qy}$ is an amount that the perspective correction parameter q changes in the y direction.

5. In a computer graphics system, a method for calculating a texture-mapping gradient comprising:

using a rasterizer to calculate constant values for use in a gradient-calculating equation;

passing the constant values to a rational linear interpolator that is configured to calculate the gradient; and computing the gradient and the calculated constant values according to the following equation: $G_{px}=\{C_{px}-C_{qx}(p_n/q_n)\}/\{q_n+C_{qx}\}$, wherein $C_{px}=(da/dx)dp_1+(db/dx)dp_2$, wherein $C_{qx}=(da/dx)dq_1+(db/dx)dq_2$, and wherein da/dx and db/dx are constant values for an entire primitive, for non-zero values of Gpx, as defined by Equation 19 of the specification.

6. The method of claim 5, further comprising using the gradient to select a texture map.

7. In a computer graphics system, a method for calculating a texture-mapping gradient comprising:

using a rasterizer to calculate constant values for use in a gradient-calculating equation; and     computing the gradient using barycentric coordinates and the calculated constant values according to the following equation: $G_{px}=\{C_{px}-C_{qx}(p_n/q_n)\}/\{q_n C_{qx}\}$, wherein $C_{px}=(da/dx)dp_1+(db/dx)dp_2$, wherein $C_{qx}=(da/dx)dq_1+(db/dx)dq_2$, and wherein $da/dx$ and $db/dx$ are constant values for an entire primitive, for non-zero values of Gpx, as defined by Equation 19 of the specification.

8. The method of claim 7, further comprising using the gradient to select a texture map.

* * * * *

UNITED STATES PATENT AND TRADEMARK OFFICE
CERTIFICATE OF CORRECTION

PATENT NO. : 6,891,548 B2 Page 1 of 1
APPLICATION NO. : 10/226967
DATED : May 10, 2005
INVENTOR(S) : Byron Alcorn et al.

It is certified that error appears in the above-identified patent and that said Letters Patent is hereby corrected as shown below:

IN THE CLAIMS

Claim 3, Column 12, line 40, delete "Cqy" and insert therefor --Cqx--

Signed and Sealed this

Twenty-seventh Day of May, 2008

JON W. DUDAS
*Director of the United States Patent and Trademark Office*